Patented July 19, 1927.

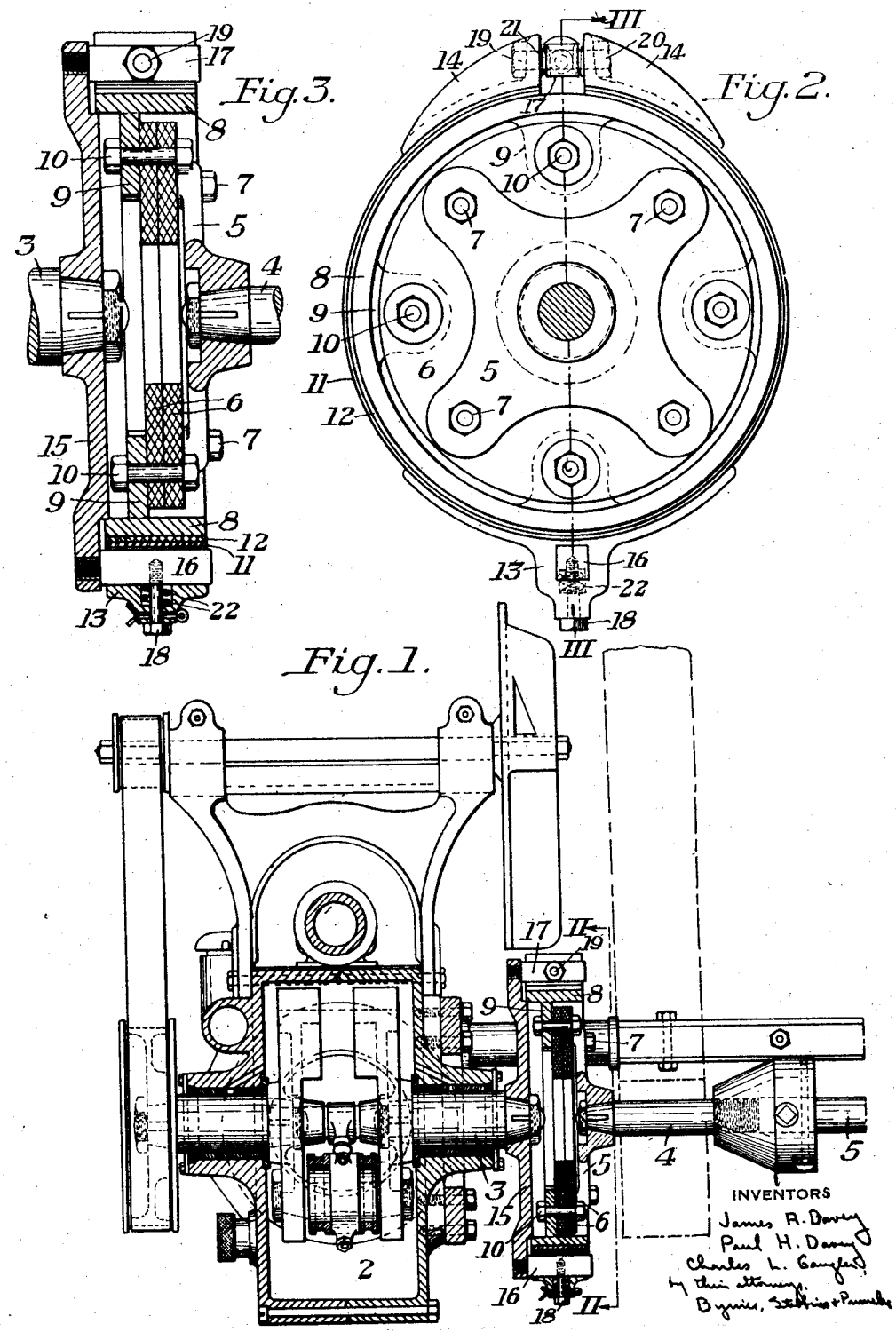

1,636,290

UNITED STATES PATENT OFFICE.

JAMES ABRAM DAVEY, OF SOUND BEACH, CONNECTICUT, AND PAUL H. DAVEY AND CHARLES L. GAUGLER, OF KENT, OHIO; SAID GAUGLER ASSIGNOR OF HIS ENTIRE RIGHT TO THE DAVEY TREE EXPERT COMPANY, OF KENT, OHIO, A CORPORATION OF OHIO.

SHAFT COUPLING.

Application filed March 16, 1925. Serial No. 15,716.

This invention relates to a shaft coupling and is especially useful in a shaft which is required to transmit an intermittent load, such, for example, as an air compressor. This invention is shown as being thus applied in our copending application Serial No. 15,717, filed of even date herewith. In that application there is shown an air compressor adapted to be mounted on the front of an automotive vehicle and to draw power from the engine thereof. We have found that under such circumstances there is always a tendency for the shaft to break unless a yielding connection is provided. It is highly desirable to provide means for connecting or disconnecting the compressor from the engine, or the like.

We provide a shaft coupling including a pair of shafts to be connected, a flexible member connected to one of the shafts and a pair of cooperating coupling members, one attached to the flexible member and one attached to the other shaft. The flexible member is preferably in the form of a disk of rubberized fabric, as this has the requisite yielding qualities and at the same time may be conveniently incorporated in a coupling structure.

In the accompanying drawings, illustrating the present preferred embodiment of our invention:

Figure 1 is a vertical section through an air compressor and the front of an automotive vehicle showing an application of our invention;

Figure 2 is a section taken on the line II—II of Figure 1; and

Figure 3 is a section taken on the line III—III of Figure 2.

In the illustrated embodiment of our invention as applied to an air compressor adapted to be driven from an automotive vehicle, there is shown an air compressor 2 having a driving shaft 3 adapted to be driven from a shaft 4 connected to the crank shaft 5 of the engine. The shaft 4 is provided with a spider 5 to which is secured a flexible disk 6 by bolts 7. Any number of these disks may be provided and in the drawings two are shown. These disks are made of several layers of fabric impregnated with rubber, such as are used in the well known Thermoid-Hardy universal joint.

Surrounding the disks 6 is a drum 8 having inwardly projecting lugs 9 fastened to the disks by bolts 10. Surrounding the drum 8 is a band 11 which is provided with any suitable lining, such as a brake band lining 12. The band 11 has fastened thereto connecting members 13 and 14 for making connection with a disk 15 secured to the shaft 3.

The disk 15 carries two diametrically opposite pins 16 and 17. The pin 16 projects through an opening in the connection member 13 and the member 13 is loosely secured on the pin 16 by a bolt 18. A bolt 19 passes through the pin 17 and engages the connection members 14. When it is desired to operatively connect the shafts 3 and 4, the nut 20 of the bolt 19 is tightened so that the band 11 firmly grips the drum 8. When this has been done there is provided a secure driving connection between the two shafts, but this connection is nevertheless sufficiently flexible to secure the desired results. When the shafts are to be disconnected the nut 20 is backed off, at which time springs 21 and 22 serve to hold the lining 12 away from the drum and prevent heating of the connection.

We provide a shaft coupling which is particularly useful for the transmission of intermittent loads such as encountered in an air compressor, but which is capable of various other applications. It will be noted that the entire structure occupies very little space, so that it may be used for such applications as that shown in Figure 1 where severe limitations of space are imposed.

While we have illustrated a preferred embodiment of the invention, it will be understood that the invention is not thus limited, as it may be otherwise embodied within the scope of the following claims.

We claim:

1. A shaft coupling including a pair of shafts, a flexible member connected to one of the said shafts, a pair of cooperating coupling members one attached to the flexible member and one attached to the other shaft, and positively-acting means for clamping the coupling members together to form a non-slipping driving connection, substantially as described.

2. A shaft coupling including a pair of shafts, a flexible disk attached to one of said shafts, a drum and a clamping band cooperating with the drum one of said cooperating members being connected to the disk and the other being connected to the other shaft, said band having a pair of separable ends, and means for drawing the ends together to clamp the band around the drum thus forming a non-slipping driving connection, substantially as described.

3. A shaft coupling including a pair of shafts, a flexible disk attached to one of said shafts, a drum, a clamping band cooperating with the drum one of said cooperating members being connected to the disk and the other being connected to the other shaft, said band having a pair of separable ends, means for drawing the ends together to clamp the band around the drum thus forming a non-slipping driving connection, and a layer of brake band lining between the drum and the band, substantially as described.

4. In a driving connection for use in a gas compressor drive having a compressor shaft and an engine shaft normally alined with said compressor shaft, the combination with a spider on one of said shafts, a drum encircling the spider, a flexible disk connecting the drum to the spider, a plate on the other shaft in opposed relation to the spider, a band encircling the drum said band being carried by said plate, and means to force the band into clamping relation to said drum.

5. In a driving connection for use in a gas compressor drive having a compressor shaft and an engine shaft normally alined with said compressor shaft, the combination with a flexible disk secured to one shaft, of a drum about the shaft fixed to said disk, and a clamping band encircling said drum said band being secured to the other shaft and means to force the clamping band into clamping relation with said drum.

6. The combination of a driving shaft, a driven shaft, a spider on one shaft, a flexible disk on the spider, a drum secured about said disk; a plate on the other shaft in opposed relation to said spider, a clamping band supported by said plate and surrounding said drum, and means whereby the band may be clamped about said drum.

7. The combination of a driving shaft, a driven shaft, a flexible disk connected to one shaft, a drum secured to the disk, a releasable clamping band encircling the drum, means to force the clamping band into clamping relation with said drum and supporting means for the band fixed to the other shaft.

8. A device as in claim 7 the flexible disk consisting of material having a torque cushioning action.

9. The combination of a driving shaft, a driven shaft, a drum secured to one of said shafts and serving as one member of a clutch, a releasable clamping band encircling the drum and serving as the other member of the clutch, means to force the clamping band into clamping relation with said drum, supporting means for the band fixed to the other shaft, and a flexible disk interposed between one of the clutch members and its shaft.

In testimony whereof we have hereunto set our hands.

JAMES ABRAM DAVEY.
PAUL H. DAVEY.
CHARLES L. GAUGLER.